United States Patent [19]

Haley

[11] Patent Number: 4,779,489
[45] Date of Patent: Oct. 25, 1988

[54] CONTROL SYSTEM FOR CONTROLLING TRANSMISSION FLUID PRESSURE

[75] Inventor: William J. Haley, Ithaca, N.Y.

[73] Assignee: Borg-Warner Automotive, Inc., Troy, Mich.

[21] Appl. No.: 23,501

[22] Filed: Mar. 9, 1987

Related U.S. Application Data

[63] Continuation-in-part of Ser. No. 879,752, Jun. 27, 1986, abandoned.

[51] Int. Cl.⁴ .............................................. B60K 41/18
[52] U.S. Cl. .................................... 74/844; 192/82 T; 251/129.08
[58] Field of Search ...................... 74/844; 192/82 T; 251/129.05, 129.08; 137/625.65

[56] References Cited

U.S. PATENT DOCUMENTS

| 3,834,617 | 9/1974 | Dyntar | 251/129.08 X |
| 4,199,048 | 4/1980 | Ishikawa | 192/82 T X |
| 4,373,697 | 2/1983 | Phelps | 251/129.08 X |
| 4,468,988 | 9/1984 | Hiramatsu | 192/82 T X |
| 4,538,644 | 9/1985 | Kuntson et al. | 137/625.64 |
| 4,678,069 | 7/1987 | Yoshimura et al. | 192/82 T X |

FOREIGN PATENT DOCUMENTS 0054284 3/1983 Japan .............................. 251/129.08

*Primary Examiner*—Dirk Wright
*Attorney, Agent, or Firm*—James J. Jennings

[57] ABSTRACT

When a pulse width modulated electrical signal is employed to operate an electro-mechanical device, such as a solenoid valve, in a transmission to produce a controlled fluid pressure whose level is proportional to the signal's duty cycle, proper operation at cold temperatures is ensured by varying the frequency of the pulse width modulated signal directly with the temperature of the transmission fluid. By decreasing the operating frequency when the transmission fluid is cold (at which time the fluid may thicken and become heavy since its viscosity will increase), the solenoid valve will be actuated slowly enough to effect flow control through the valve and adequate regulation of the fluid pressure.

8 Claims, 2 Drawing Sheets

CONTROL SYSTEM FOR CONTROLLING TRANSMISSION FLUID PRESSURE

RELATED APPLICATION

This application is a continuation-in-part of the earlier application filed June 27, 1986, Ser. No. 879,752, now abandoned, and having the same title, inventor and assignee as the present application.

BACKGROUND OF THE INVENTION

This invention relates to a control system for regulating the transmission fluid pressure in a transmission, and is particularly useful in maintaining proper pressure control under cold weather conditions when the transmission fluid thickens and its viscosity increases, resulting in a substantially reduced flow rate.

The pressure of transmission fluid is, of course, controlled in a transmission in order to hydraulically actuate appropriate elements to change the ratio between a driving input shaft and a driven output shaft, and this occurs in all types of transmissions, such as industrial, automotive, marine, manual, automatic, continuously variable, etc. In accordance with one well-known pressure control arrangement, pressurized transmission fluid is supplied to an electro-mechanical device, usually a solenoid valve, which is operated by a pulse width modulated (PWM) electrical signal, namely a signal of rectangular waveshape having periodically recurring positive-going pulse components with intervening negative-going pulse components. The frequency of the PWM signal is constant (for example, around 100 hertz) but the relative widths (connoting time durations) of the positive and negative pulse components are varied. As the width or duration of each positive pulse component increases, each negative pulse component decreases proportionally, and vice versa. In other words, since the period or time duration of a complete cycle is fixed or constant, when the duration of a positive pulse component changes in one sense or direction, the width of the immediately succeeding negative pulse component must change in the opposite direction. The PWM signal has a duty cycle characteristic which is the ratio of the width of each positive-going pulse compared to the duration of a complete cycle.

The solenoid valve is turned on and off, or opened and closed, in response to the pulses of the PWM signal to control the flow of the pressurized transmission fluid through the valve. The fluid pressure at the valve's outlet will be established at some level less than that of the pressurized fluid supply as determined by the ratio of the open times relative to the closed times (the greater the ratio, the greater the outlet pressure), which in turn is a function of the PWM signal's duty cycle. When, for example, a higher transmission fluid pressure is required to perform some function (such as to actuate a clutch, to position a sheave, or to shift gears), the duty cycle of the PWM signal is adjusted in the direction and to the extent necessary to produce the desired higher fluid pressure.

Such PWM signal-controlled solenoid valves operate very satisfactorily under normal operating temperatures. Under cold weather or low temperature conditions, however, the transmission fluid may not flow through the valve at a required minimum rate and it may be difficult to obtain proper pressure control. The solenoid will alternately energize and de-energize to open and close the valve, but, due to the increased viscosity and thickness of the transmission fluid at low temperatures, insufficient fluid may flow through the valve during each valve opening and the desired fluid pressure may not be attained. This shortcoming has now been overcome by the present invention which provides a transmission fluid pressure control arrangement that will function appropriately under all weather conditions and regardless of operating temperature. The invention allows a transmission to operate satisfactorily over a much wider temperature range.

SUMMARY OF THE INVENTION

The invention provides a control system for controlling the transmission fluid pressure in a transmission and comprises means for developing an electrical signal having a characteristic which is adjustable or variable. Means is provided to respond to the electrical signal and to the pressurized transmission fluid to produce a controlled transmission fluid pressure the level of which is determined by, and is proportional to, the characteristic of the electrical signal. Temperature sensing means is provided for sensing the temperature of the transmission fluid and there is means responsive to the temperature sensing means for adjusting the characteristic of the electrical signal as a function of the temperature of the transmission fluid.

In accordance with a more detailed aspect of the invention, the electrical signal is a pulse width modulated (PMW) signal, and the pulse width is the particular signal characteristic which is varied or adjusted. The PWM signal is developed by a microcomputer which is controlled by the temperature sensing means, a solenoid valve being actuated by the PWM signal to produce the controlled fluid pressure.

DESCRIPTION OF THE DRAWINGS

The features of the invention which are believed to be novel are set forth with particularity in the appended claims. The invention may best be understood, however, by reference to the following description in conjunction with the accompanying drawings in which:

DESCRIPTION OF THE ILLUSTRATED EMBODIMENT

Figure 1:
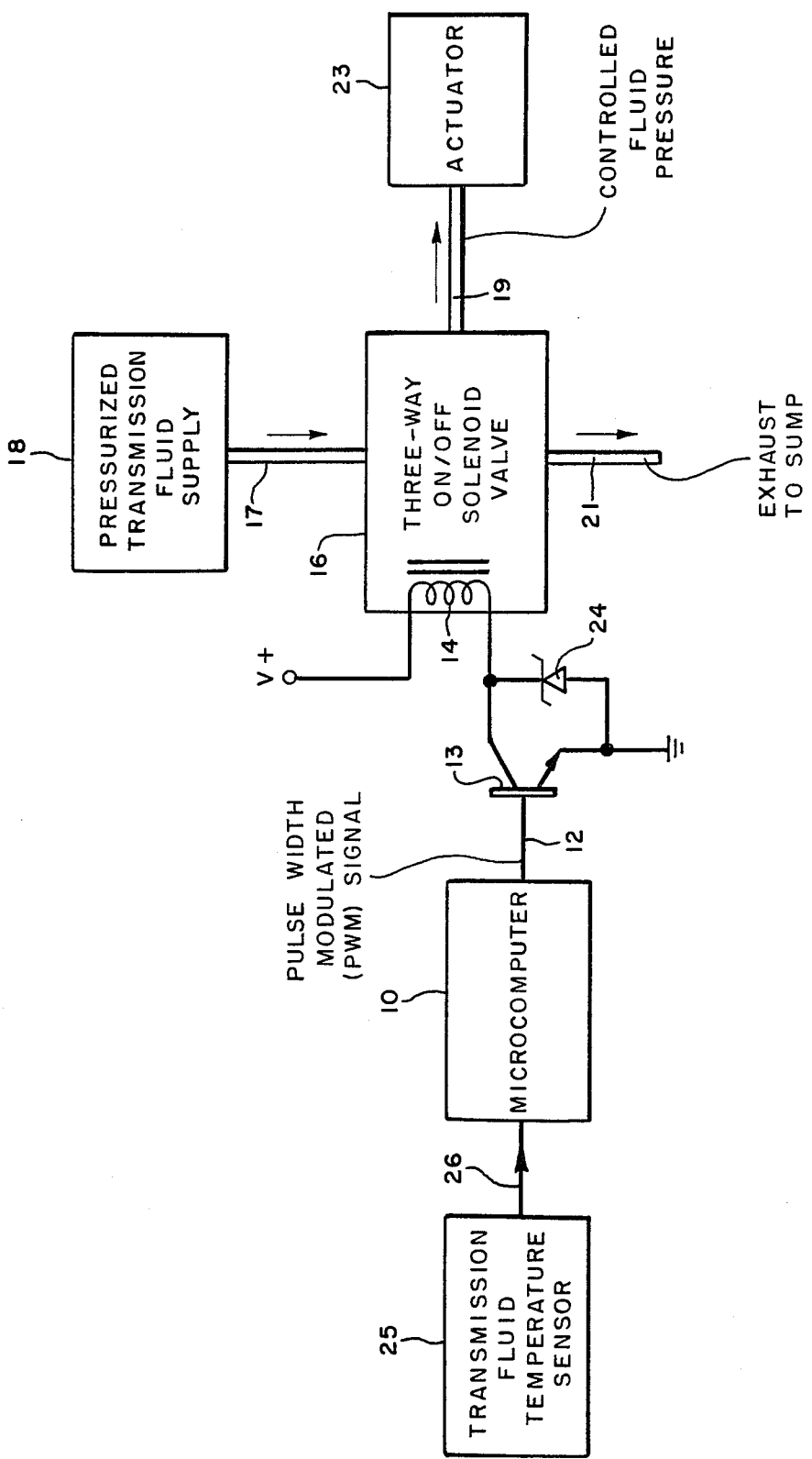
FIG. 1 schematically illustrates a control system, constructed in accordance with the invention, for controlling the transmission fluid pressure in a transmission.

Referring to FIG. 1, a microcomputer 10 is employed to generate a pulse width modulated electrical signal whose duty cycle is adjustable. This is a well known method for producing such a PWM signal in a transmission and a microcomputer may easily be programmed to vary the signal's duty cycle on command and in response to certain variables or parameters. The PWM signal is applied over conductor 12 to operate the driver, comprising transistor 13, to control the energization of the solenoid coil 14 which is included in the three-way on/off solenoid valve 16. During the occurence of each positive-going pulse of the PWM signal, transistor 13 conducts to energize coil 14, whereas during the occurence of each of the intervening negative-going pulses transistor 13 will be turned off and coil 14 will be de-energized.

Solenoid valve 16 is of conventional construction and operates in a well-known manner. It is normally closed so that when coil 14 is de-energized valve 16 is in its closed position wherein the inlet port, which receives pressurized transmission fluid over line 17 from source or supply 18, is closed off and the outlet line 19 is connected through the valve to the exhaust port which is coupled via line 21 to a sump. In this closed position, the fluid (if any) in line 21 will be discharged to the sump and outlet line 19 will be established at the discharge or exhaust pressure. Energization of coil 14 shifts solenoid valve 16 to its open position wherein line 17 is connected to line 19 to supply the full pressurized transmission fluid to an actuator 23, which schematically represents any mechanism for utilizing or responding to the fluid pressure to regulate the operation of the transmission, such as a brake, clutch, sheave, valve, etc. In the open position of solenoid valve 16, the exhaust port is closed or sealed off.

Since a pulse width modulated signal is applied to the base of transistor 13, coil 14 will be alternately energized and de-energized to rapidly switch the solenoid valve 16 between pressure in and exhaust out, in accordance with the signal's duty cycle, to create a controlled fluid pressure, between the pressure levels in lines 17 and 21, for application over line 19 to actuator 23. The smaller the duty cycle, the briefer the energization of coil 14 during each cycle of the pulse width modulated signal, and the less the transmission fluid pressure applied to actuator 23. Hence, by increasing the duty cycle of the PWM signal on conductor 12, the energization time of coil 14 may be increased, causing the fluid pressure in line 19 to be increased. Diode 24 protects transistor 13 against inductive voltage spikes generated by coil 14 turning off.

The arrangement described thus far is an entirely conventional system for regulating the transmission fluid pressure in a transmission in order to hydraulically control the transmission's operation. The three-way solenoid valve 16 could be replaced by a two-way type, but more fluid would be discharged to the sump in such an arrangement and thus a three-way solenoid is preferred. Moreover, there are other electro-mechanical systems that may be employed in place of a solenoid valve.

Turning now to the invention, to ensure that solenoid valve 16 functions properly at all conceivable temperatures of the transmission fluid, that temperature is sensed by sensor 25 to produce, for application to microcomputer 10 over conductor 26, an electrical signal which has a characteristic that represents the sensed transmission fluid temperature. Microcomputer 10 may easily be programmed to set the frequency of the pulse width modulated signal at a level directly proportional to the sensed temperature so that sufficient pressurized transmission fluid will flow through solenoid valve 16, each time the valve is open, to produce the desired controlled fluid pressure in line 19. In other words, by changing the frequency of the PWM signal, but not its duty cycle, the fluid pressure in line 19 will be established at the desired level dictated by that duty cycle, while each time the solenoid valve is opened it will be kept open long enough to allow adequate fluid to flow therethrough to maintain the pressure in line 19 at the required value.

Figure 2:
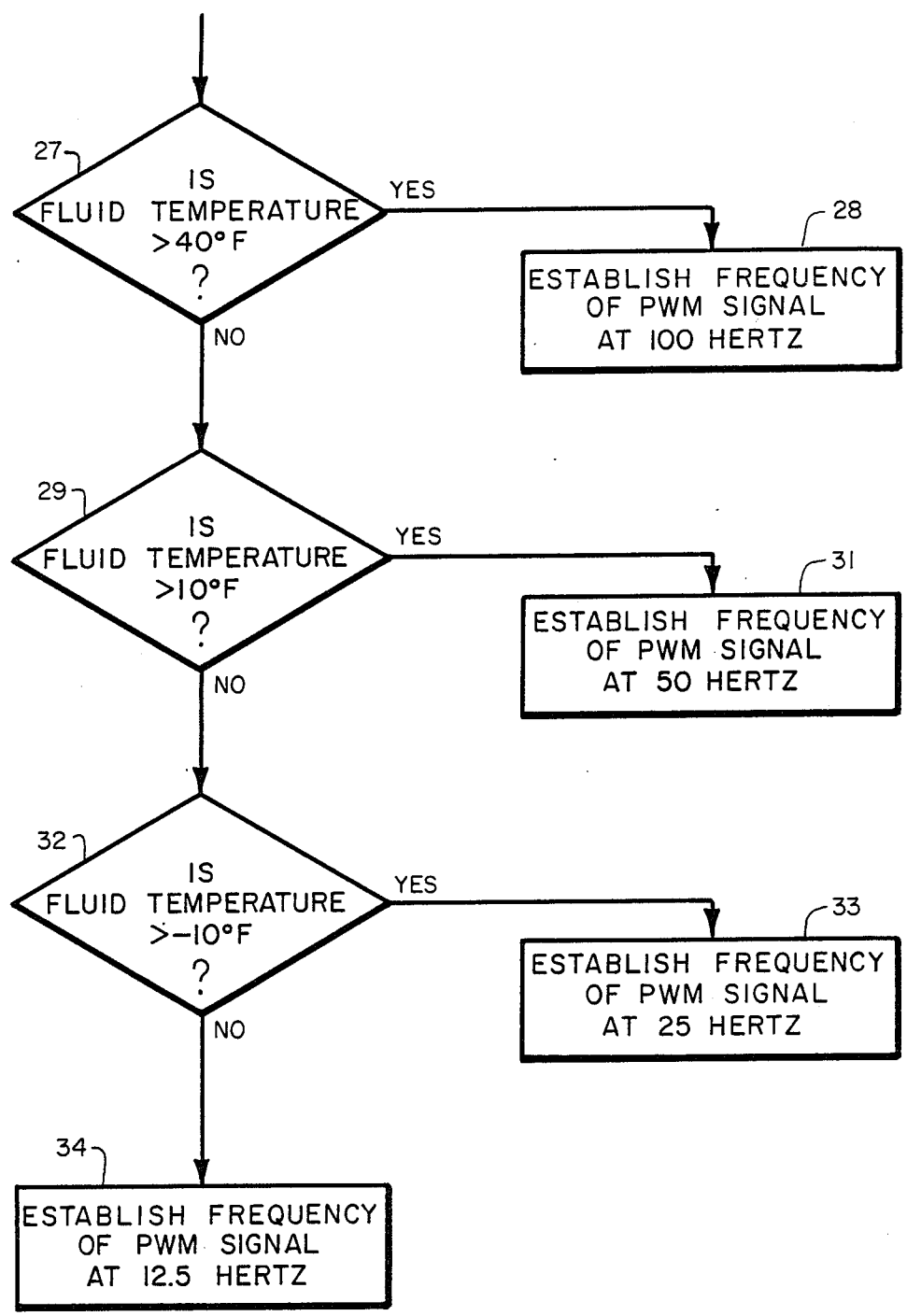
FIG. 2 is a logic flow chart illustrating a logic sequence of operations and decisions which occur in operating the control system of FIG. 1 and will be helpful in understanding the invention.

Preferably, the frequency of the PWM signal is decreased in steps as the temperature drops through different temperature ranges. This is implemented by operating the microcomputer in accordance with the subroutine illustrated by the flow diagram of FIG. 2. Of course, microcomputer 10 would respond to a variety of different parameters and variables so its complete program would be substantially greater than that shown in FIG. 2. Only that portion of the program is illustrated which deals with the setting of the frequency for the pulse width modulated signal. As indicated by decision block 27 and operating block 28, if the fluid temperature is greater than 40° F. (or Fahrenheit) the frequency of the PWM signal is established by the microcomputer at 100 hertz. On the other hand, if the temperature is less than 40° F. decision block 29 is entered, in accordance with which a determination is made as to whether the fluid temperature is above 10° F., in which case the frequency of the PWM signal is set at 50 hertz (see operation block 31). If the temperature is below 10° F. but above −10° F., the frequency is set at 25 hertz, as indicated by blocks 32 and 33. Finally, if the fluid temperature is less than −10° F. the frequency of the PWM signal is established by microcomputer 10 at 12.5 hertz, as shown by block 34.

In short, a series of four temperature ranges, over which the transmission fluid temperature may conceivably vary, are effectively established and the microcomputer is programmed to set the frequency of the pulse width modulated signal at a selected one of a corresponding series of four different frequencies depending on the particular temperature range in which the sensed temperature falls, the lower the range, the lower the frequency.

Of course, a frequency of 100 hertz achieves the fastest response time and the best transmission operation, but the lower frequencies will still provide very satisfactory operation, even though the response time is sacrificed.

It will be appreciated that while the illustrated control system is microcomputer based, the invention could be implemented instead with other integrated circuits or even with discrete circuit components. Also other characteristics of an electrical signal, such as the amplitude of an analog signal or the frequency of a frequency modulated signal, could be utilized in place of the PWM characteristic described in the preferred embodiment.

While only a particular embodiment of the invention has been described, modifications may be made, and it is intended in the appended claims to cover all such modifications as may fall within the true spirit and scope of the invention.

What is claimed is:

1. A control system for controlling the transmission fluid pressure in a transmission, comprising:
    means for developing an electrical signal having a characteristic which is adjustable;
    a supply of pressurized transmission fluid;
    means responsive to said pressurized transmission fluid and to said electrical signal for producing a controlled transmission fluid pressure the level of which is determined by, and is proportional to, the characteristic of the electrical signal; and
    temperature sensing means for sensing the temperature of the transmission fluid, said means for developing an electrical signal being responsive to said temperature sensing means, for adjusting the characteristic of the electrical signal as a function of the temperature of the transmission fluid.

2. A control system according to claim 1, wherein said temperature sensing means produces a temperature related electrical signal representing the sensed transmission fluid temperature, and wherein said electrical signal is developed by a microcomputer which is controlled by the temperature related electrical signal and is programmed to adjust the characteristic of the electrical signal as a function of the sensed temperature.

3. A control system for controlling the transmission fluid pressure in a transmission, comprising:
   means for developing a pulse width modulated electrical signal having an adjustable duty cycle;
   a supply of pressurized transmission fluid;
   means responsive to said pressurized transmission fluid and to said pulse width modulated signal for producing a controlled transmission fluid pressure the level of which is determined by, and is proportional to, the signal's duty cycle; and
   temperature sensing means for sensing the temperature of the transmission fluid, said means for developing a pulse width modulated electrical signal being responsive to said temperature sensing means for varying the frequency of the pulse width modulated signal directly with the temperature of the transmission fluid.

4. A control system according to claim 3, wherein said temperature sensing means produces a temperature electrical signal representing the sensed transmission fluid temperature, and wherein said pulse width modulated signal is developed by a microcomputer which is controlled by the temperature signal and is programmed to set the frequency of the pulse width modulated signal at a level determined by the sensed temperature.

5. A control system according to claim 4, wherein a series of temperature ranges, over which the transmissiono fluid temperature may conceivably vary, are effectively established and wherein the microcomputer is programmed to set the frequency of the pulse width modulated signal at a selected one of a corresponding series of different frequencies depending on the particular temperature range in which the sensed temperature falls, the lower the range, the lower the frequency.

6. A control system according to claim 3, wherein the controlled transmission fluid pressure is produced by supplying the pressurized transmission fluid to an electro-mechanical device which is operated by said pulse width modulated signal.

7. A control system according to claim 3, wherein the controlled transmission fluid pressure is produced by supplying the pressurized transmission fluid to a solenoid valve which is operated by said pulse width modulated signal.

8. A control system according to claim 3, wherein the controlled transmission fluid pressure is produced by supplying the pressurized transmission fluid to a three-way on/off solenoid valve which is rapidly switched between pressure in and exhaust out in response to the pulse width modulated signal.

* * * * *